United States Patent

Hamilton

[11] Patent Number: 5,098,082
[45] Date of Patent: Mar. 24, 1992

[54] SPRUNG-WHEEL

[75] Inventor: Thomas A. Hamilton, Fife, Scotland

[73] Assignee: Unisys Corporation, Blue Bell, Pa.

[21] Appl. No.: 586,907

[22] Filed: Sep. 24, 1990

[30] Foreign Application Priority Data

Nov. 11, 1989 [GB] United Kingdom ............... 89-25565

[51] Int. Cl.⁵ .............................................. B65H 5/06
[52] U.S. Cl. .................................... 271/274; 226/175; 226/191
[58] Field of Search ................. 271/274; 226/175, 191

[56] References Cited

U.S. PATENT DOCUMENTS 3,369,765  2/1968  Jensen ............... 226/191 X
4,448,554  5/1984  Driemeyer ............ 271/274 X

FOREIGN PATENT DOCUMENTS 206767  9/1986  Japan .................... 226/191

Primary Examiner—Richard A. Schacher
Attorney, Agent, or Firm—Whitham & Marhoefer

[57] ABSTRACT

A sprung wheel 46 for a document drive system comprises an upper elastic member 54, a lower elastic member 52, a separating hub 50 and a rim member 56. Each elastic member 42,54 comprises resilient arms 58 which bear upon the rim member 56 on the inside. As the time member 56 is moved eccentrically from the hub 50, supported on a spindle 48, so the resilient arms exert a restoring force. In the second embodiment, the resilient arms 74 are held on the rim portion 561 as opposed to the hub portion 50. The independence of compression of the upper 54 and lower 52 resilient members commits tilting of the rim portion 56, 561.

7 Claims, 4 Drawing Sheets

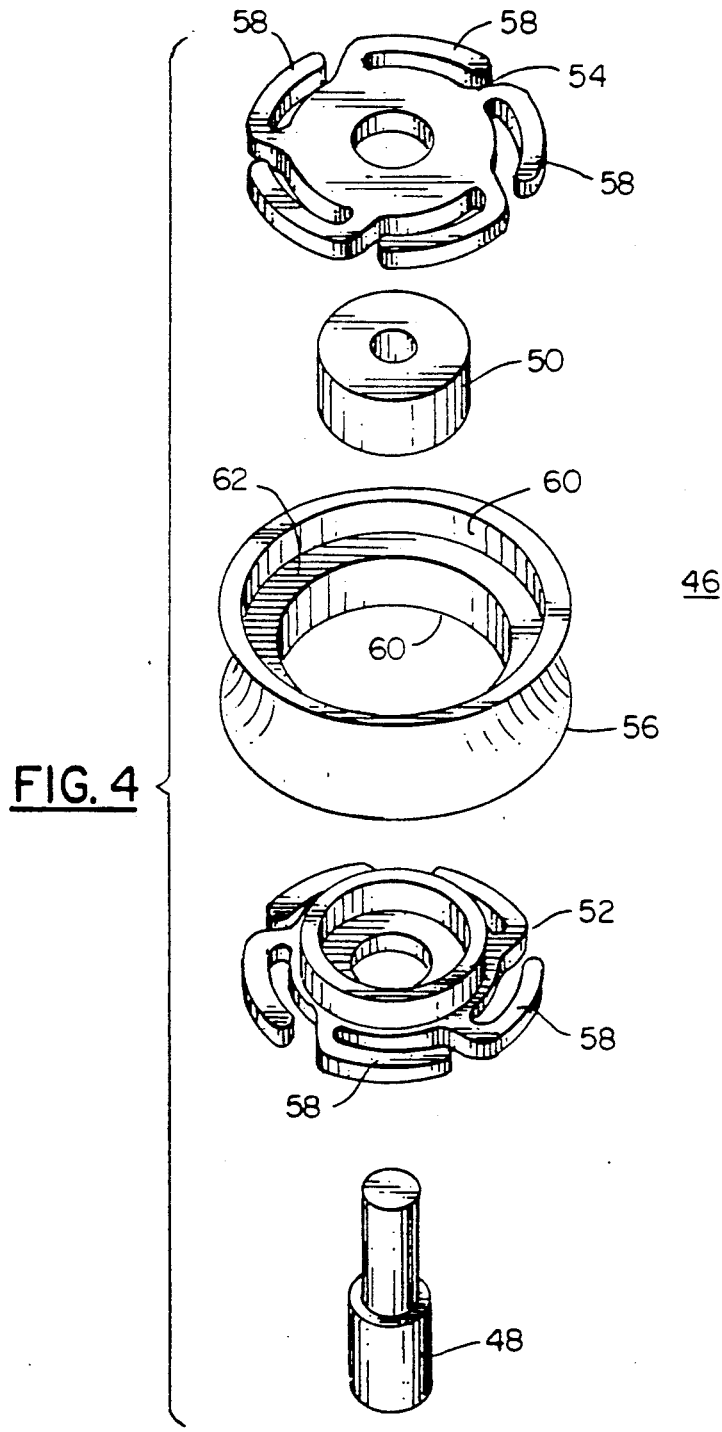

SPRUNG-WHEEL

The present invention relates to document transport equipment, and especially relates to a style of wheel, for use in opposition to another wheel, for gripping a document there-between, to move the document.

In document encoding, character reading and any other equipment where a document is required to be moved from place to place, it is customary to provide a pair of opposed wheels, one of which is driven and the other of which is an idler wheel. Belts and other devices may also be interposed there-between. Nonetheless, it is the purpose of the two opposed wheels to cooperate to grip a document and, by friction drive to its surface, to move it from place to place, as required.

In an environment where a standard document is used, there is not problem in setting the pressure and separation between the opposed wheels. This still requires skilled labour. Unfortunately, many different kinds of documents are required to be handled. When this is the case, documents can vary in thickness from thin tissue paper to thick board. It then becomes vital to ensure that documents do not jam or exert duly high pressure between the opposd wheels.

This is a most difficult process. Various spring devices have been employed. In order that the opposed wheels should drive a document over an acceptable range of thicknesses and with acceptable pressure, it has been customary to provide one or other of the wheels on a spring loaded arm. Setting up such spring loaded arms with correct pressure and separations is a complicated matter.

In order to overcome the expense and complexity of such setting up, the present invention seeks to simplify the wheel or wheels so that they may be used on fixed centres without spring loaded arms. The present invention consists in a wheel for use in a document drive system comprising; a hub; an elastic member on said hub; and a rim member on said elastic member; said rim member defining the periphery of said wheel; said elastic member supporting said rim member, radially spaced from said hub; and said elastic member being operative to deform and provide opposing force to accomodate pressure on said rim member.

Not all documents are uniform in vertical cross-section. It is a disadvantage of the prior art that, notwithstanding spring loaded support arms, the wheels are inherently incapable of intimate engagement with a document having a sloping surface. Because of this, thick documents of uncertain outline cannot be accomodated. Likewise, deviation of the vertical face of an opposed wheel cannot be accomodated. To overcome these problems, the present invention further provides a wheel according to the previous paragraph wherein the elastic member comprises an upper member and a lower member; the lower member being spaced from the upper member in the direction of the axis of the hub; the upper and lower members being compressible independently of one another; the upper member supporting an upper part of the rim member; and the lower member supporting a lower part of the rim member. In this way, the rim is able to tilt whilst still being supported in an elastic manner.

The assembly of parts required to make an elastic member is generally very complex. A lot of parts and time are required to make it work. In order to simplify the construction and lower the cost of the elastic member, in addition to the features already described, the present invention further provides that the elastic member comprises a plurality of angularly spaced resilient arms. These arms may be supported on the hub, or on the rim member, as will hereinafter be described.

In order that the wheel may display elasticity up to a pre-determined limit, the present invention provides means to limit the extent of compressibility of each radial arm. In addition to the features described in the above paragraph, the present invention further provides that each resilient arm comprises a tip at a distal end and a base at a proximal end, each tip, when the elastic member is fully compressed, clearing the base of the resilient arm adjacent thereto. In this way, the tip lies next to but clear of the base on the next arm around and assists in providing a firm end to elastic compression without damage to the resilient arms.

The present invention, for convenience, provides that the wheel can be provided either as the driven or the idler element of a pair.

To simplify the design and tooling required to make a document moving machine, the present invention further provides, in additional to all the features previously described, that the hub is provided on a fixed centre. Thus, the resilient behaviour required to keep one wheel opposed to another in a pair is entirely provided by the rim in cooperation with the elastic member.

The invention is further described, by way of an example, by the following description taken in conjunction with the appended drawings in which:

FIG. 4 is an exploded view of a wheel according to the present invention.

FIG. 7A is a plan view of a second type of wheel, according to the present invention, where the resilient fingers are supported on the rim; and.

Figure 1A:
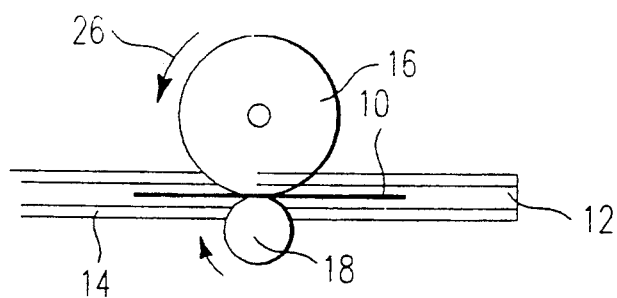
FIG. 1A is a plan view of a document drive system suitable for use with the present invention.
Figure 1B:
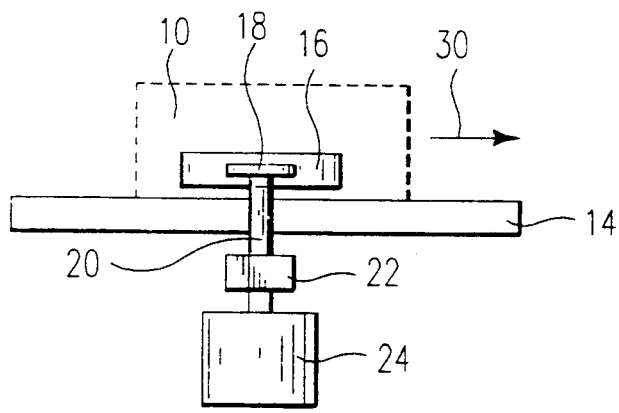
FIG. 1B is a side elevation of FIG. 1A looking in the direction of the arrow.

FIGS. 1A and 1B show the environment wherein the present invention may be used. A document 10 (shown in FIG. 1B in phantom outline) moves in a slot 12 in a document track 14 gripped between a driven wheel 16 and an idler wheel 18. The idler wheel 18 is free to rotate on an idler wheel shaft 20 held on a support 22 which can be part of the main body of a document encoder, document reader or any other apparatus which requires to move a document 10 along a track 14. A motor 24 rotates the driven wheel 16 as indicated by a first arrow 26 and the idler wheel 18 rotates, either by direct engagement with the driven wheel 16 or via the document 10, as indicated by a second arrow 28. In response, the document moves as indicated by a third arrow 30.

Figure 2A:
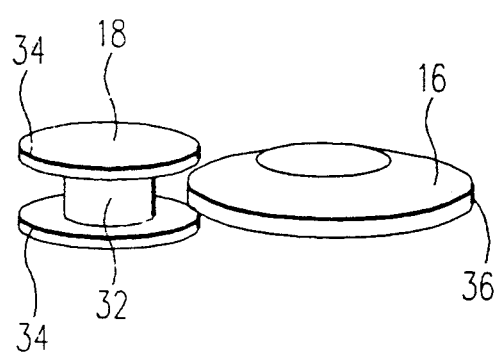
FIG. 2A is a projected view of a particular kind of opposed wheel pair where contact does not take place.
Figure 2B:
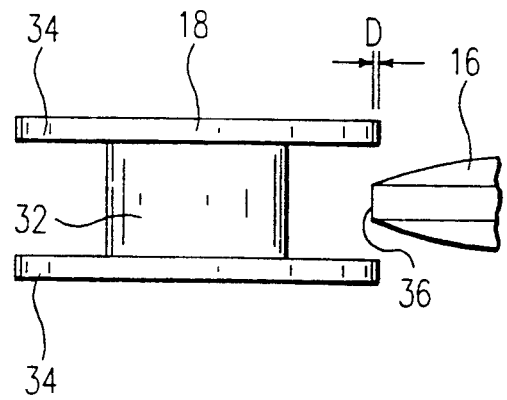
FIG. 2B is an elevation of FIG. 2A.

FIGS. 2A and 2B show one form in which the driven wheel 16 and the idler wheel 18 can engage without touching. The idler wheel 18 has a generally convex surface, shown in this extreme case as comprising a central spindle 32 and rims 34 of greater diameter than the central spindle 32. The driven wheel comprises a narrowed edge 36 which passes between the rims 34 but does not engage the central spindle 32, there being a controlled degree of overlap indicated in FIG. 2B by D. As a document 10 passes between the driven wheel 16 and the idler wheel 18, it is distorted slightly between the narrowed edge 36 and the rims 34 and pressure is thereby exerted on the document. It will be appreciated that it is necessary carefully to control the degree of overlap D and to control the elastic restitution force experienced between the idler wheel 18 and the driven wheel 16. The type of idler wheel 18 and driven wheel 16 shown in FIGS. 2A and 2B is exemplary of the type usable in the present invention. The example given serves to illustrate the problem overcome by the present invention. The present invention may equally be used on smooth faced wheels 16, 18 which are intimately engaged with one another.

Figure 3A:
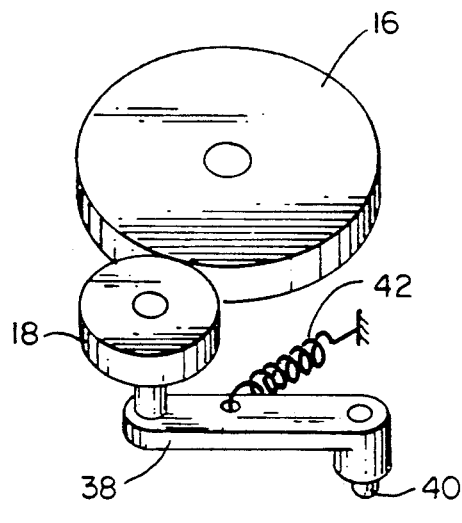
FIG. 3A is a prior art solution to the maintenance of pressure between the opposed wheels.
Figure 3B:
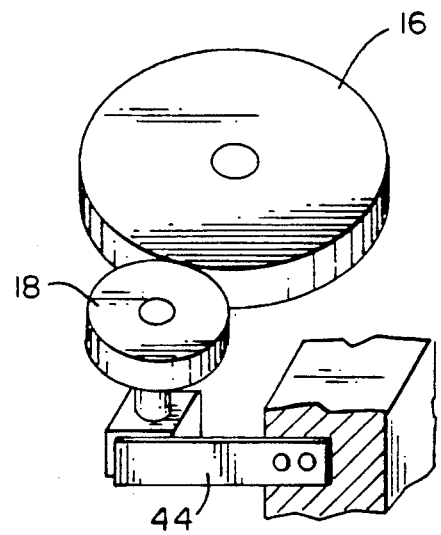
FIG. 3B is a further prior art solution to the problem of controlling pressure between two opposed wheels.

FIGS. 3A and 3B show two examples of a prior art solution for controlling the elastic pressure between the driven wheel 16 and the idler wheel 18. In FIG. 3A the idler wheel 18 is supported on a rotatable arm 38, rotatable about support bearing 40 and urged towards the driven wheel 16 by a helical spring 42.

FIG. 3B shows another prior art usage where a spring arm 44 replaces the rotatable arm 38. It is to be appreciated that the exact tension exerted by the spring 42 or the spring arm 44 requires to be adjusted, in the prior art, by skilled labour. Equally, in that instance where wheels 16, 18 of the type shown in FIGS. 2A and 2B are used, stops are required to be carefully adjusted to achieve the separation D shown in FIG. 2B.

FIG. 4 shows an exploded view of a sprung wheel 46 according to the present invention. The sprung wheel 46 may equally be used as an idler wheel 16 or a driven wheel 18. Those skilled in the art will perceive, from the later description, how simple modification may make this so.

A spindle 48 supports a hub 50 in turn receiving a lower elastic member 52, an upper elastic member 54, and a rim portion 56. The hub 50 is gripped between the lower elastic member 52 and the upper elastic member 54 and provides anchorage thereto and separation there-between. Resilient arms 58 on the upper elastic member 54 and the lower elastic member 52, when assembled, and as later shown, engage upper and lower inner sufaces 60 of the rim portion 56 separated by a separation section 62 of substantially the same thickness as the hub 50. The hub 50 fits firmly on the spindle 48 and, if the sprung wheel 46 is to be driven, is rotated with the spindle 48. If the sprung wheel 46 is to be an idler wheel 18, the spindle 48 is held in a bearing free to rotate.

Figure 5:
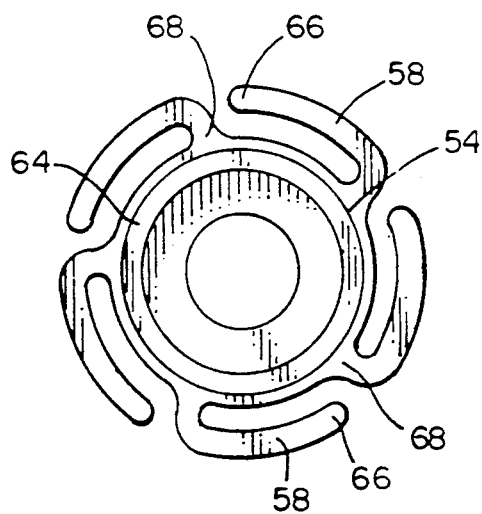
FIG. 5 is a plan view of an elastic member of FIG. 4.

FIG. 5 is a plan view of the upper elastic member 54 of FIG. 4. It is to be understood that it is as equally a view of the lower resilient member 56.

A sleeve 64 fits around and engages the hub 50. Each resilient arm 58 comprises a tip 66 at its distal end and a base 68 at its proximal end, all with reference to the sleeve 64. The shape and length of the resilient arms 58 are chosen such that, on full compression, the tip 66 falls clear of the base 68 of that resilient arm, next around. The resilient arms 58, as shown, are angularly spaced.

In this way, as resilient arms 58 are fully compressed, a definite limit to elasticity is reached. The tips 66 of the resilient arms 58 reach their closest position towards the hub 50 but do not engage any other resilient arm 58 in a damaging way. In this manner, the maximum range of elastic behaviour for the resilient arms 58 is obtained.

Figure 6:
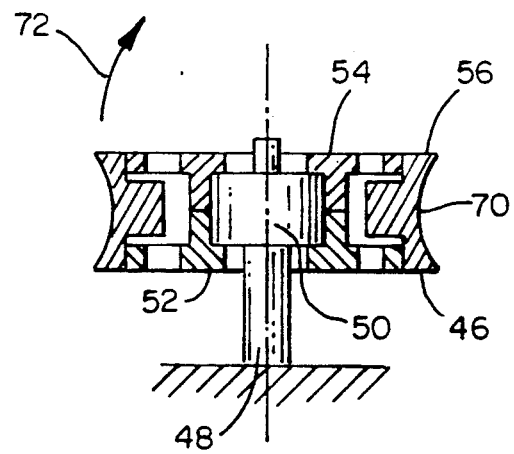
FIG. 6 is a cross-sectional view of the assembled wheel of FIG. 4, in side elevation diametrically sectioned.

FIG. 6 is a cross-sectional view of the sprung wheel 46, provided for clarification. The rim portion 56 is provided with a dished periphery 70 generally conforming to the concavity of the exemplary idler wheel of FIG. 2A, but without discrete rims 34. It is of course to be understood that the periphery 70 might be formed in any other shape which is convenient. Most importantly, the spindle 48 is on a fixed centre. That is to say, the spring loaded devices of FIGS. 3A and 3B are entirely dispensed with. All resilient behaviour is accomodated by the resilient arms 58 moving in conformity with displacement of the rim portion 56. In particular, because the upper rim portion 54 is independently compressible from the lower rim portion 52, a tilting action can be imparted to the rim portion 56 as indicated by a fourth arrow 72. In this way, documents which are not of uniform cross-section can be accomodated, the sprung wheel 46 having a tiltable rim 56 to ensure intimate contact with the document. Equally, shoulld the sprung wheel 46 be used with any other wheel which is of irregular outline, or which has become worn, or which is vertically displaced, automatic accomodation for the differences is achieved.

Figure 7A:
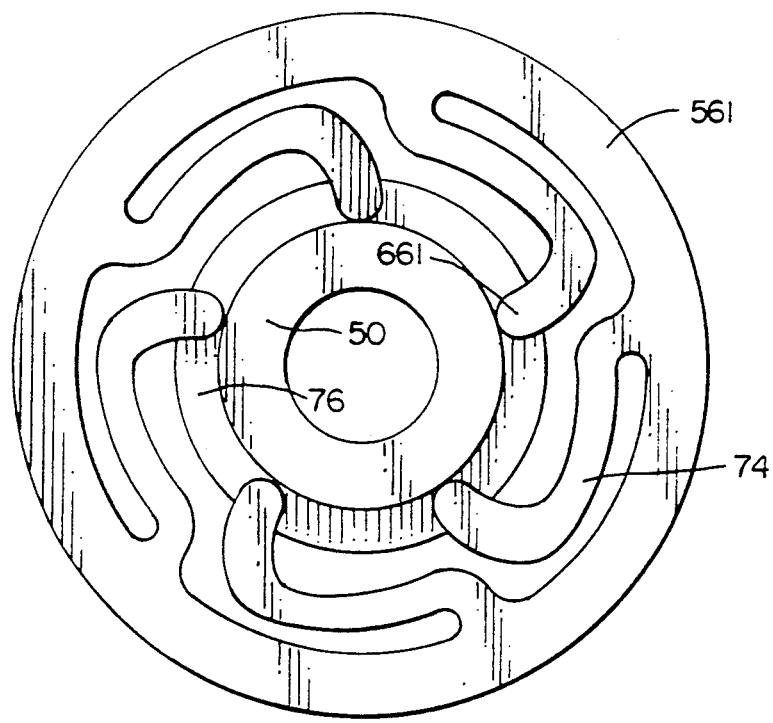
Figure 7B:
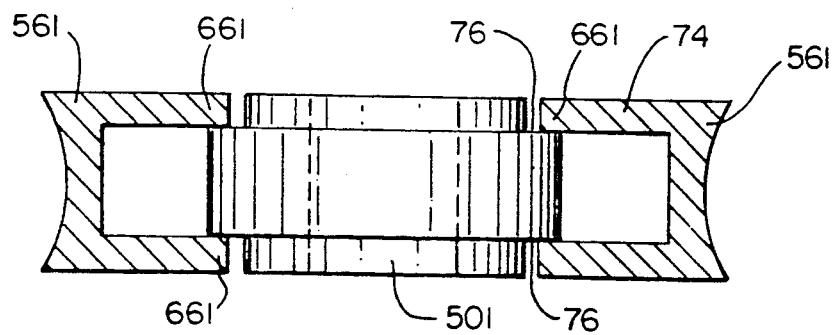
FIG. 7B is a cross-sectional view in side elevation of FIG. 7A diametrically sectioned.

FIGS. 7A is a plan view and FIG. 7B is a cross-sectional elevation, diametrically sectioned, of an alternative embodiment of the present invention where a second type of resilient arm 74 is held not on the hub 50 but on a modified rim portion 561 to engage a modified hub 501 where the tips 661 of the second type of resilient arm 74 engage ledges 76 on the modified hub 501. The second type of resilient arm 74 are also shown as being of a different shape from the resilient arms 58 of FIG. 4. While the resilient arms 58 of FIG. 4 are shown of a generally spiral shape, the arms 58, 74 can be of any shape chosen and of any cross-section to achieve desired characteristics of return force versus compression.

The parts of the sprung wheel 46 are preferably moulded from resilient plastic material, though any elastic material can be used. For preference, the present example uses DELRIN (Trade Mark), acetile resin. The embodiment is not restricted in any way to this material and even spring steel may be used. The force versus deflection characteristic depends on the profile and can be chosen by the skilled man to meet whatever needs are required.

I claim:

1. A wheel for use in a document drive system comprising in combination;

a shaft having a longitudinal axis;
a hub mounted on said shaft;
a first radially deformable elastic member secured to said hub;
a second radially deformable elastic member secured to said hub;
said first and second radially deformable elastic members spaced from one another along said longitudinal axis;
a first rim member surrounding said first radially deformable elastic member, said rim member defining a first peripheral surface of said wheel for engaging a document;

a second rim member surrounding said second radially deformable elastic member, said rim member defining a second peripheral surface of said wheel for engaging a document;

said first radially deformable elastic member supporting said first rim member so that said first elastic member deforms in response to pressure from a document on said first rim member and the periphery of said first rim member is displaced with respect to said shaft; and said second radially deformable elastic member supporting said second rim member so that said second elastic member deforms in response to pressure from a document on said second rim member and the periphery of said second rim member is displaced with respect to said shaft.

2. A wheel according to claim 1 wherein said elastic member comprises a plurality of angularly spaced resilient arms comprising a tip at the distal end and a base at a proximal end with said distal end free to move relatively to said rim.

3. A wheel according to claim 2 wherein each resilient arm comprises a tip at a distal end and a base at the proximal end; each tip portion, when said elastic member is fully compressed, clearing the base of the resilient arm adjacent thereto.

4. A wheel according to claim 1 wherein the hub is a driven member.

5. A wheel according to claim 2 wherein the hub is a driven member.

6. A wheel according to claim 1 wherein said hub is on a fixed centre.

7. A wheel according to claim 2 wherein said hub is on a fixed centre.

* * * * *